(12) United States Patent
Chan et al.

(10) Patent No.: US 7,339,471 B1
(45) Date of Patent: Mar. 4, 2008

(54) NIGHTTIME-CONTROLLED LIGHTING SYSTEM

(75) Inventors: Peter Chan, Quarry Bay (HK); Timothy Edward Monroe, Lincoln, CA (US); James T. Serra, Long Beach, CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 214 days.

(21) Appl. No.: 11/323,837

(22) Filed: Dec. 28, 2005

Related U.S. Application Data

(60) Provisional application No. 60/640,943, filed on Dec. 30, 2004.

(51) Int. Cl.
*G08B 13/00* (2006.01)
*H05B 41/36* (2006.01)

(52) U.S. Cl. ............. 340/541; 340/565; 315/159; 315/360

(58) Field of Classification Search ........... 340/541, 340/565, 555; 313/531; 315/150, 156, 158, 315/159, 360; 307/140, 157
See application file for complete search history.

(56) References Cited

U.S. PATENT DOCUMENTS

| | | | |
|---|---|---|---|
| 4,568,868 A * | 2/1986 | Schlepp et al. | 320/101 |
| 4,575,659 A | 3/1986 | Pezzolo et al. | |
| 5,442,177 A | 8/1995 | Boulos et al. | |
| 5,589,741 A | 12/1996 | Terman et al. | |
| 5,808,294 A | 9/1998 | Neumann | |
| 5,825,019 A * | 10/1998 | Birrell | 250/214 AL |
| 6,144,161 A | 11/2000 | Kimmich et al. | |
| 6,151,529 A | 11/2000 | Batko | |
| 6,225,748 B1 | 5/2001 | Evans et al. | |
| 2004/0021079 A1 | 2/2004 | Lee | |
| 2006/0250027 A1* | 11/2006 | Pasma | 307/140 |

OTHER PUBLICATIONS

INTELECTRON, Solid Brass Motion Detector Carriage Lantern, 1994, 3 pages, Hayward, California USA.
Intelectron, Model BC8700K Motion Detector Security Light, 1992, 1 page, Hayward, California USA.

* cited by examiner

*Primary Examiner*—Toan N. Pham
(74) *Attorney, Agent, or Firm*—Fulwider Patton LLP

(57) ABSTRACT

A time-controlled security lighting system records the length of nighttime and is capable of automatically adjusting for seasonal nighttime hours. The time duration between the initial nighttime darkness and the light of dawn, as sensed from the prior day by a photocell, is measured and recorded in memory. As the surrounding area becomes dark, the lighting system is activated to provide the illumination for the area. The duration of illumination is determined based on a predetermined fraction of the recorded length of nighttime from the previous night. The control system can adjust the duration of illumination according the recorded nighttime durations from the previous night. The control system can also adjust the level of illumination based on the signals from a motion detector, where the lights are set at a higher brightness for a predetermined amount of time upon detection of motion.

20 Claims, 5 Drawing Sheets

NIGHTTIME-CONTROLLED LIGHTING SYSTEM

This application claims the benefit of U.S. Provisional Application No. 60/640,943 filed on Dec. 30, 2004, the contents of which are hereby incorporated by reference in their entirety.

FIELD OF THE INVENTION

The present invention relates generally to lighting systems, and more particularly, to a control system for security lighting systems.

BACKGROUND OF THE INVENTION

Lighting systems are commonly used for aesthetic purposes around residences and businesses. Security lighting systems are also commonly used to monitor residential and business properties during nighttime hours. The illumination provided by these lighting systems can provide a certain element of security at night. Such lighting systems may be controlled by a mechanical or electronic timer so that the lighting system is turned on for selected periods of time, such as during hours of darkness. The timer automatically turns the lighting on and off at specific times when a building is unoccupied to give the impression that people are present within the building. One disadvantage to the use of a timer is the precision by which it operates. If the lights are turned off at the same precise time over a period of days, a potential intruder might conclude that the building is unoccupied.

In addition, many conventional timers are motor driven and based on a twenty-four hour period. The current required for the motor drive may prevent the use of battery backup. As a result, a loss of power will shift the control system's timing mechanism forward, and the change in timing may cause the lighting to turn on at improper times, which may dispel the desired impression of occupancy.

Other systems for lighting control use photosensors in so-called dusk-to-dawn control systems, which are configured to turn lights on and off based upon the presence (or absence) of daylight. These systems are primarily designed to keep the perimeter of a building illuminated constantly, and are not intended to give an impression of building occupancy. Also, because the lights will remain illuminated all night, the energy consumption is greater than that which would be required for an illumination period lasting from one third to one half of the night time.

Another method of controlling a lighting system uses a motion detector capable of turning on the light when movement is detected. A motion detector may use a variety of methods of detecting movement including infrared or sound. The motion detector may be activated to switch on a light upon the detection of motion. Activation of the motion detector by an individual entering into the monitored area, turns on the light to illuminate the area for a period of time. However, there may be significant amounts of normal activity during the early evening hours that could repeatedly trip the motion detector and undesirably activate the lighting system.

SUMMARY OF THE INVENTION

Briefly, and in general terms, the present invention provides a time-controlled lighting system. The lighting system can operate in one of several different modes. In one mode of operation, the lighting system stores in memory the previous lengths of time between onset of darkness at night and the light of dawn. As the surrounding area becomes dark, the lighting system is activated to provide illumination for the area. The duration of illumination is determined based on the length of time between dusk to dawn of the previous night stored in memory. At one setting, the duration of illumination is set for one-half of the length of time between dusk to dawn of the previous night. At another setting, the duration of illumination is set for one hour less than one-half of the time between dusk to dawn of the previous night. Other variations in the duration of illumination can be set and calculated based on the recorded time duration between dusk and dawn in the past. Signals from a motion detector may also cause the activation of lighting for a predetermined amount of time upon detection of motion. The lighting system is also capable of other modes of operation, including where the activation of lighting is controlled solely by the level of ambient light.

These and other aspects and advantages of the present invention will become apparent from the following more detailed description, when taken in conjunction with the accompanying drawings which illustrate, by way of example, the preferred embodiments of the invention.

DETAILED DESCRIPTION OF THE PREFERRED EMBODIMENTS

Figure 1:
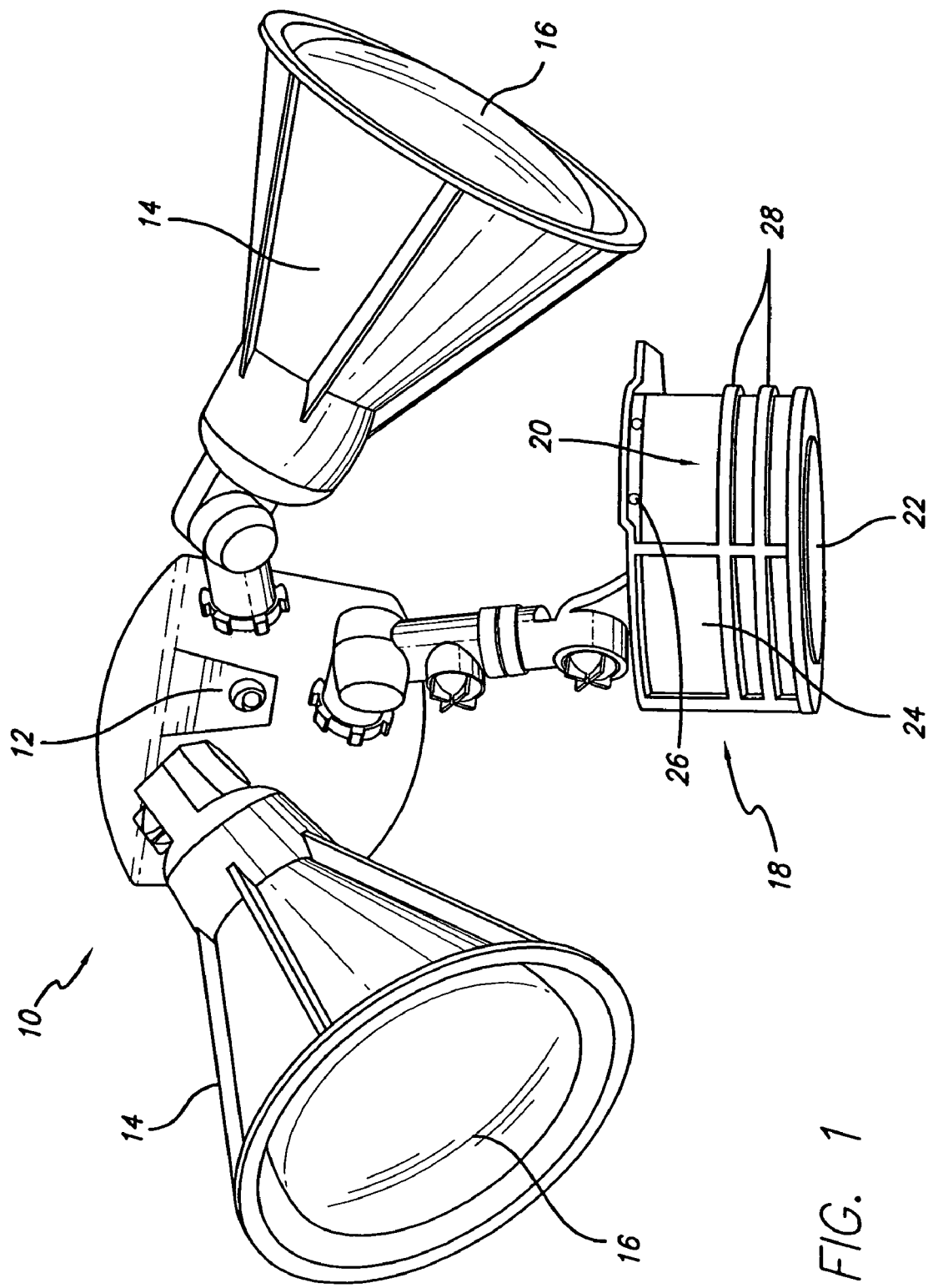
FIG. 1 is a perspective view of a security lighting fixture having a motion detector.

Referring now to the drawings in which like reference numerals are used to refer to like or corresponding elements among the several views, an embodiment of a security lighting system 10 is illustrated in FIG. 1. It is to be understood that the fixture for the lighting system 10 may range in sophistication from ordinary to decorative. Attached to the base 12 of the lighting system 10 are two holders 14 for suitable lamps 16. Preferably, the lamps 16 are electric incandescent lights, but other light sources may be used. The orientation of the lamp holders 14 may be individually adjusted to change the direction or aim of each lamp 16. Preferably, the lamp holders are positioned about forty-five degrees below the horizon to protect against rain and other weather conditions.

A housing 18 for a motion detector 20 is also attached to base 12 of the lighting system 10. The motion detector 20 preferably utilizes a passive infrared device such that the movement of heat sources such as a walking person or a moving vehicle in the coverage area will be detected. Although a passive infrared (PIR) motion detector is described herein, it is to be understood that the invention is not limited to this type of motion detector, and that sound-based, light-based, and other types of motion detectors may be used.

A control panel 22 for the lighting system 10 is preferably located on the bottom of the motion detector housing 18. It is to be understood that the control panel could be located anywhere on the fixture for the lighting system, or that the control panel could be located remotely from the fixture. The motion detector housing 18 may also include lens blinders behind the motion detector lens 24 for altering the detection angle where the motion detector coverage is greater than one desires. For example, the lens blinders may be adjusted to partially block the motion detector and reduce the detection angle from 270 degrees to 180 degrees. This may avoid undesired activations by the motion detector. A suitable lens blinder is described in U.S. patent application Ser. No. 10/704,085, filed on Nov. 7, 2003, the entire contents of which are hereby incorporated by reference. The orientation of the motion detector housing 18 can also be adjusted to detect motion in a desired area. A protective grill 26 may also be placed over the motion detector lens 24. The motion detector housing may also include LED indicators 28 to signal when the lighting fixture is powered on and/or when the motion sensor is operational. In one mode of operation for the security lighting fixture 10, the motion detector 20 may cause activation of the lamps 16, but the motion detector may have no effect on the activation of the lamps in another mode of operation.

Figure 2:
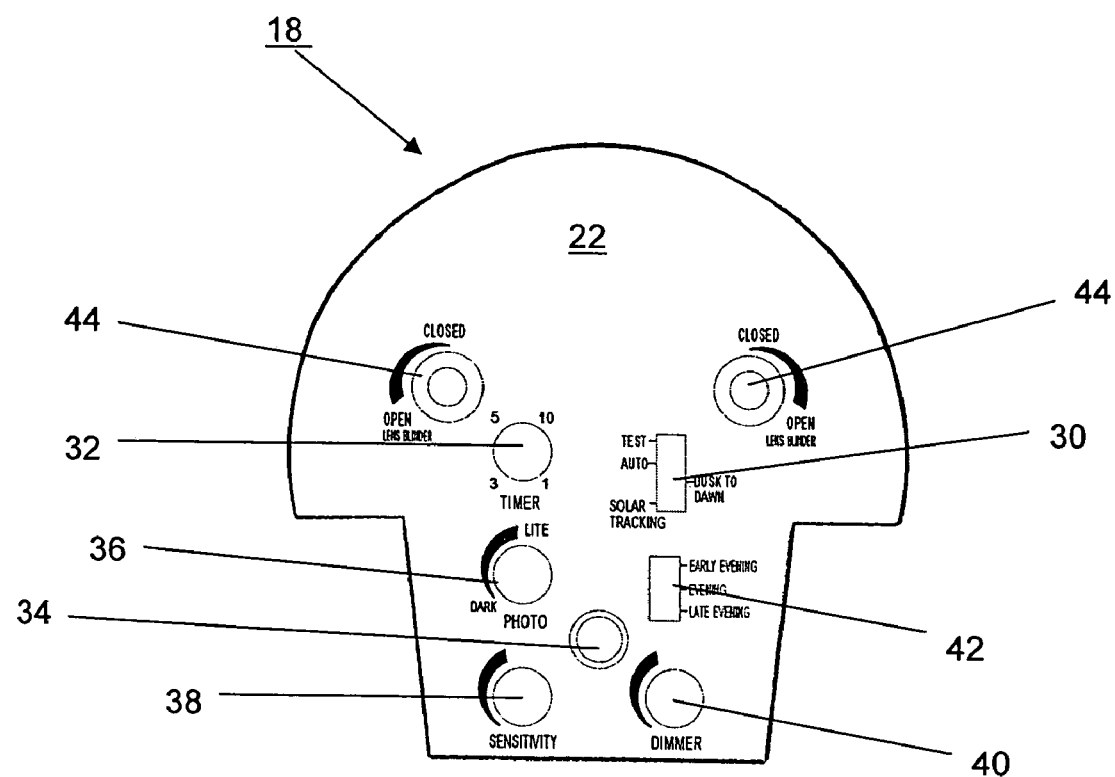
FIG. 2 is a view of the control panel for the lighting system illustrated in FIG. 1 in accordance with the present invention.

FIG. 2 illustrates the control panel 22 on the bottom of the housing 18 for the lighting system 10. The control panel 22 includes a mode switch 30 for selecting between four different modes of operation: Test; Auto; Dusk To Dawn; and Solar Tracking. Although not identified on the control panel, there is another mode, namely the Stand-by Mode which is the initial mode of operation when the lighting system is first turned on.

In the Stand-by Mode, when the power is first applied to the lighting system 10 to turn it on, the lamps 16 will turn on and remain lit for preferably about fifty seconds to one minute regardless of any motion that is detected by the motion detector 20, after which the lamps 16 will turn off and the lighting system 10 will then begin to operate in the mode selected by the mode switch 30. However, it the mode switch 30 is set to Auto, then the lamps 16 will stay off during the first fifty seconds to one minute, after which the lighting system 10 will then begin to operate in Auto Mode. Other initial operations for a Stand-by Mode may also be used, depending on the desired operating characteristics.

When the Auto Mode is selected by the mode switch 30, after its passive infrared sensor of the motion detector 20 senses a heat source moving in the coverage area, the lamps 16 are activated. The lamps 16 stay on to illuminate the area so long as the motion detector 20 continues to register movement in the coverage area. When the motion detector 20 no longer senses motion in the coverage area, the lamps 20 will continue to illuminate the area for a predetermined amount of time, and then turn off automatically. In a preferred embodiment, the a predetermined time of one, three, five, or ten minutes may be selected by a timer switch 32. The Auto Mode is preferably responsive only after the photocell sensor 34 has determined that it is sufficiently dark for the lighting system to warrant operation. The control panel preferably includes a photocell dial 36 that controls and adjusts the sensitivity of the photocell 34. In Auto Mode, the photocell dial 36 adjusts when the motion detector 20 becomes active for the evening and when it will become inactive during daylight hours.

In the Dusk To Dawn Mode, when set by the mode switch 30, the lamps 16 turn on automatically at dusk and stay lit until dawn. The photocell dial 36 can be used to adjust the sensitivity of the photocell 34 which determines the level of daylight at which the lamps 16 will activate at dusk, and when the level of daylight at which the lamps 16 will become inactive at dawn. Thus, the user can set the amount of darkness required for the lighting system to activate the lamps 16. The lamps 16 may be activated before the sunset, or when the ambient conditions become completely dark. The timer switch 32 does not affect the operation of the Dusk To Dawn Mode. The operation of the lamps 16 is similarly unaffected by the motion detector 20. In another preferred embodiment, the motion detector 20 may cause the lamps 16 to output an increased brightness or illumination for a predetermined amount of time set by the timer switch 32 when sufficient movement is detected in the coverage area.

When the mode switch 30 is set to Test, the motion detector 20 will activate the lamps 16 when movement is detected in the coverage area, and the lamps 20 preferably will remain lit for about four seconds or any other predetermined amount of time desired. The lamps 20 will be reactivated when movement is again detected in the coverage area. The Test Mode may be used as an aid in determining the coverage area (including the aim and viewing angles) and the sensitivity of the motion sensor 20. The control panel includes controls 44 for closing and opening the lens blinder to adjust the angle vision of the motion detector 20. Here, there are two controls 44 that allow for the separate adjustment of the lens blinder on opposite sides of the motion detector lens 24. The motion detector housing 18 can be adjusted to change the orientation or aim of the motion detector 20. The sensitivity of the motion detector 20 can be adjusted by a sensitivity dial 38 while in Test Mode. In addition, the light output of the lamps 20 can be adjusted by a dimmer dial 40 while in Test Mode. Preferably, the Test Mode is used after installing the lighting system 10 for the first time.

When the Solar Tracking Mode is selected by the mode switch 30, the lamps 30 are illuminated for a period of time after the onset of darkness. In a preferred embodiment of this mode of operation, the light system 10 will initially activate the lamps 16 at onset of darkness at dusk depending on the sensitivity setting for the photocell dial 36, and preferably remain activated for six hours for the first night.

The length of nighttime is measured and recorded in memory. In one preferred embodiment, the length of nighttime is measured from the time the photocell senses that the ambient light level is below a threshold value representing the onset of darkness or dusk, to the time the photocell senses that the ambient light level has increased to a threshold value representing the light of dawn or daybreak. The dusk threshold value may be the same as the dawn threshold value. The dusk threshold value may also be set to be different from the dawn threshold value. In an alternate embodiment, the measured duration of nighttime may be determined by subtracting the measured the amount of time the ambient light level is at daylight levels (e.g., the time from the dawn threshold value to the dusk threshold value) from twenty-four hours.

The length of nighttime is retained as a reference value for determining the amount of time the lamps 16 will be turned on while in the Solar Tracking Mode. A reference point or datum of "mid-night" is then calculated based on the measured nighttime. As used herein, "mid-night" represents the half-way point between dusk and dawn. Preferably, this mid-night datum is one-half the nighttime measured from the previous night. Alternatively, the mid-night datum may be calculated by averaging the nighttimes measured over a period of several prior nights, and then dividing that average value by two.

After the first night, the duration for which the lamps 16 remain illuminated while in the Solar Tracking Mode, will be from dusk as sensed by the photocell 34 until the calculated mid-night time or a derivative or variation thereof. Since nighttime hours vary with the seasons, the control system will adjust incrementally according the recorded nighttime durations from the prior nights. Other variations in the duration of illumination can be set and calculated based on the recorded nighttimes, which may be determined by the control system. In a preferred embodiment, the user may select the Late Evening, Evening, or Early Evening setting with the tracking switch 42 shown in FIG. 2. At the Late Evening setting, the lamps 16 will turn off at the calculated mid-night. For the Evening setting, the lamps 16 will turn off one hour before the calculated mid-night. And for the Early Evening setting, the lamps 16 will turn off two hours before the calculated mid-night. These settings are preferably microprocessor-controlled, and the program software can provide alternate settings or times.

Figure 3:
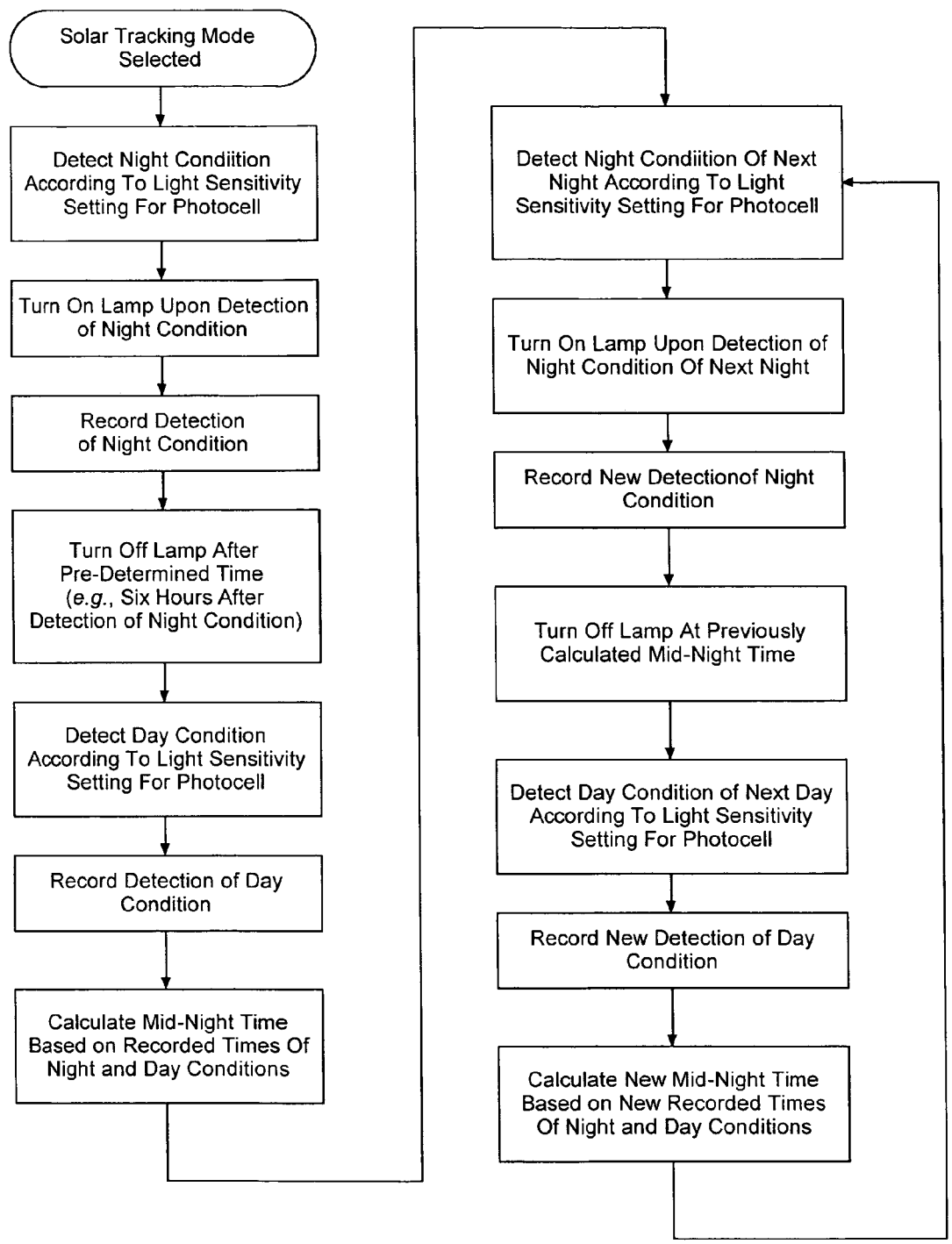
FIG. 3 is a flow chart diagram illustrating one preferred operation of the lighting control system in accordance with the present invention.

A preferred embodiment of the Solar Tracking Mode, as previously discussed, is illustrated in the flow chart of FIG. 3. In this embodiment, the amount of illumination emitted by the lamps 16 is preferably at a low level to provide accent lighting. In an alternative embodiment, the level of illumination by the lamps may be the same as in the other modes of operation for the lighting system.

The Solar Tracking Mode learns the proper amount of time to activate lighting for the covered area, and adapts to the gradual daily and seasonal changes of nighttime duration. Depending on the geographic latitudes of the location where the lighting system is used, the duration of nighttime between summer and winter can vary by several hours. If the lighting system is installed in a northern geographical latitude, the lighting may stay on illuminating later than if the lighting system were installed in a southern geographical area. For example, if the tracking switch 42 is set to the Early Evening setting, the lighting may turn off at 10:30 PM in Chicago, whereas the lighting at the same setting may turn off at 10:00 PM in Kansas City, or at 9:30 PM in Miami.

Figure 4:
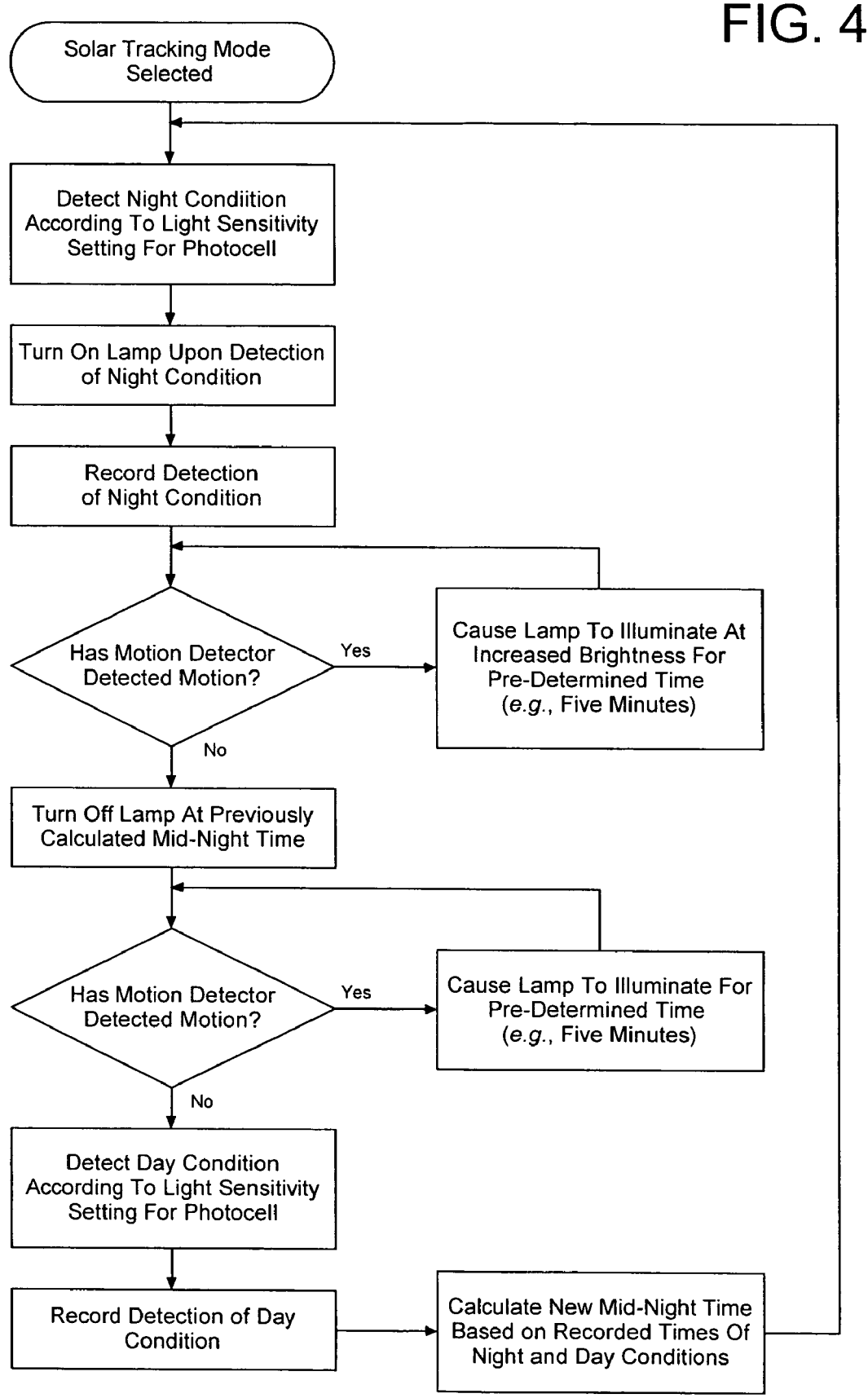
FIG. 4 is a flow chart diagram illustrating another preferred operation of the lighting control system in accordance with the present invention.

In another preferred embodiment, there are two levels of lighting in the Solar Tracking Mode, as previously discussed, and illustrated in the flow chart of FIG. 4. The control system can adjust the level of illumination based on the signals from a motion detector, where the lights are set at a higher brightness for a predetermined amount of time upon detection of motion. Again, in this embodiment, the amount of illumination emitted by the lamps 16 is at a low level to provide accent lighting.

After the determined time to turn off lamps 16 according to the calculated mid-night or variant thereof, but before dawn is sensed by the photocell, should the motion detector 20 detect movement in the covered area, the control system would cause the lamps 16 to be activated at normal or high illumination for a predetermined amount of time, or for an amount of time based on how long movement is detected in the covered area. The level of illumination emitted by the lamps may be greater when activated by the motion sensor than the period when the lamps are illuminated during the determined duration of illumination for the Solar Tracking Mode. As noted earlier, the motion detector does not activate the lamps after dawn is sensed by the photocell. In the embodiment illustrated in FIG. 3, the motion detector will not affect the level of accent lighting time during the Solar Tracking Mode, regardless whether movement is detected in the covered area. For the embodiment illustrated in FIG. 4, where there is detectable movement in the covered area for the motion detector, the lighting level will be increased from the accent lighting of the Solar Tracking Mode to normal or high illumination for a predetermined amount of time.

In addition to the four modes selectable by the mode switch 30, the lighting system 10 can also be manually activated by toggling the power supply to the lighting system. In one preferred embodiment, uncoupling and then recoupling the power supply to the lighting system within about three seconds will cause the lamps 16 to activate. Toggling the power supply to the lighting system again will turn off the lamps 16, and cause the lighting system to reset to the Auto Mode or the Test Mode, depending on the selected setting of the mode switch 30. Otherwise, the lamp 16 preferably will remain illuminated for about eight hours while in this Manual Override Mode, after which the lighting system will reset itself to the Auto Mode or the Test Mode, depending on the setting of the mode switch 30. This allows the user to turn on and off the lighting system 10 regardless whether there is motion in the covered area.

In a preferred embodiment, where the Manual Override Mode is selected while in the active Solar Tracking Mode for accent lighting, the lamps 16 are deactivated. Toggling the power supply afterwards returns the lighting system to the accent lighting of the Solar Tracking Mode. In an embodiment where there are two levels of light available, the Manual Override Mode will not override the level of lighting set for the mode being overridden. In another alternate embodiment, the Manual Override Mode would override the lighting level of the overridden mode to cause the lamps 16 to emit their maximum illumination.

The operation of the different modes for the lighting system 10 is preferably controlled by a microcontroller unit (MCU) that is programmable, has on-board memory, and can interface directly with analog signals. Other desired operative settings for modes such as the Solar Tracking Mode can be made by modifying the software for the microcontroller unit. For example, the microcontroller software may take into effect daylight savings time as it tracks the amount of daily sunlight for the Solar Tracking Mode.

Figure 5:
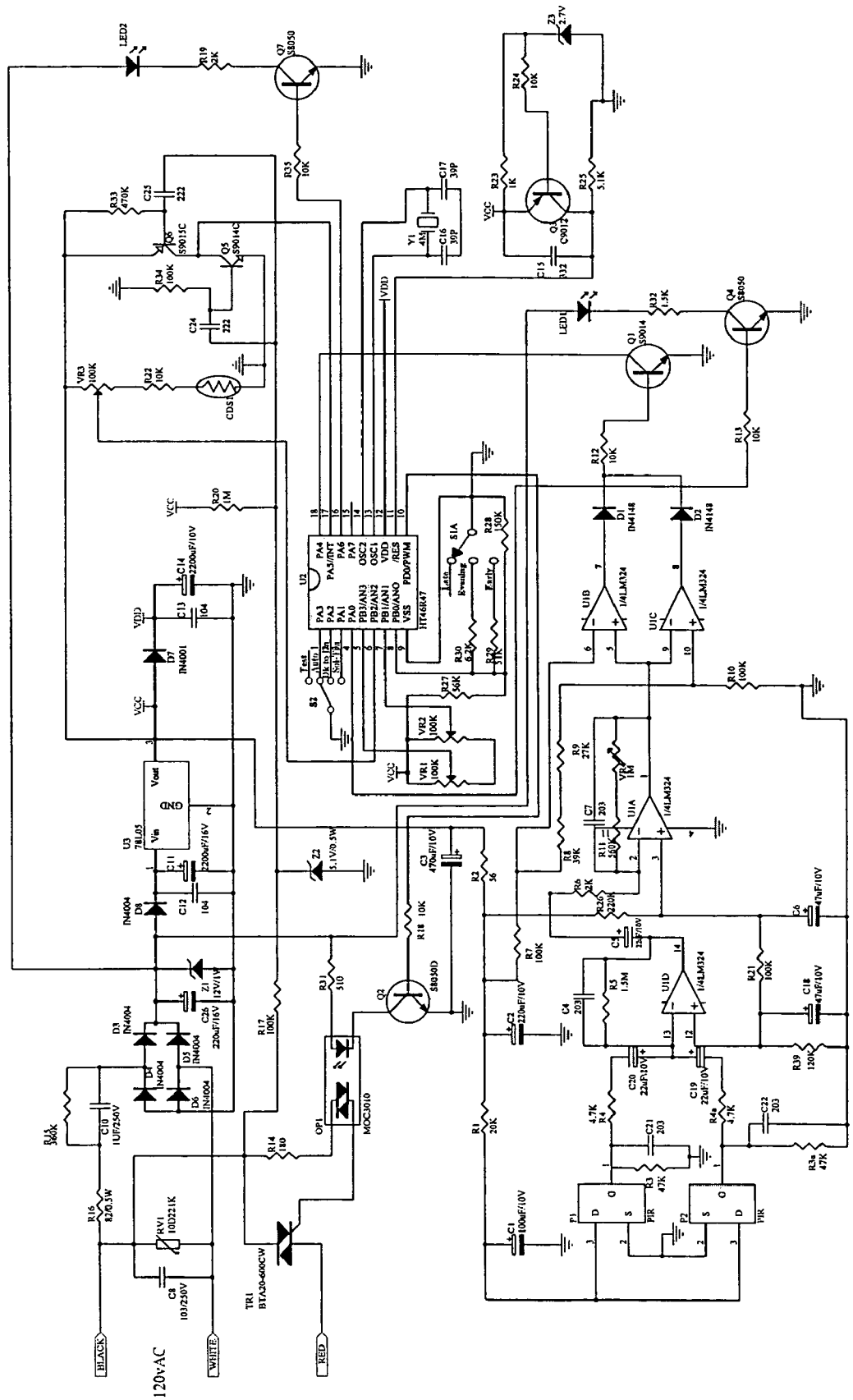
FIG. 5 is a circuit schematic illustrating an embodiment of the lighting system in accordance with the present invention.

A circuit schematic of a preferred embodiment of the lighting system 10 is illustrated in FIG. 5, and should be readily understood by one of ordinary skill in the art. The circuit illustrated in FIG. 5 is designed for use with a standard 120 V, 60 Hz line circuit. The diodes D3, D4, D5 and D6 form a bridge rectifier for the AC power supplied by the line circuit. The rectified output is provided to a voltage regulator U3. A commercially available 78L05 voltage regulator may be used to provide a stable 5 volt output. The 5 volt reference from voltage regulator U3 is connected to one end of variable resistor VR3. The other end of the variable resistor VR3 is connected in series to resistor R22 and photocell CDS1. The photocell CDS1 would correspond to the photocell 34, and the variable resistor VR3 would correspond to the photocell dial 36 discussed in connection with FIG. 2. The output of photocell CDS1 is delivered to a microcontroller unit U2.

In this preferred embodiment, the microcontroller unit (MCU) is a 8-bit, high performance, RISC architecture microcontroller device that is suitable for analog/digital (A/D) applications that interface directly to analog signals. This preferred embodiment uses the HT46R47 microcontroller from Holtek Semiconductor, Inc., which has One-Time Programmable (OTP) Memory where application code is programmed into the device. This microcontroller also includes data memory RAM. The data memory is divided into two functional groups: special function registers and general purpose data memory. Details concerning the HT46R47 microcontroller can be found in the "HT46R47/HT46C47 Cost-Effective A/D Type 8-Bit MCU" Data Sheet, and the "HT46R47, HT46R22, HT46R23, HT46R24 A/D Type MCU Handbook" (December 2004), published by Holtek Semiconductor, Inc., the contents of which are both hereby incorporated by reference.

The microcontroller unit U2 controls the operation of the lighting system 10, and stores the prior nighttime durations required for the Solar Tracking Mode operation. The Reset pin of microcontroller unit U2 is connected to a series regulator formed by the zener diode Z3 and the transistor Q3, which in turn is connected to the output of the voltage regulator U3. These circuit elements would be part of the Manual Override Mode previously discussed.

The switch S1A is connected to the output of voltage regulator U3. And the switch S1A is also connected to the microcontroller unit U2. The switch S1A selects between the Late Evening, Evening, and Early Evening settings for the Solar Tracking Mode. The switch S1A is coupled to different resistances depending on which setting is selected. The Early Evening selection adds resistor R29 having resistance of 51 KΩ. The Evening selection adds resistor R30 having resistance of 6.2 KΩ. The Late Evening selection is not connected to a resistor. The switch S1A would correspond to the tracking switch 42 discussed in connection with FIG. 2.

The switch S2 is connected to ground, and can be connected to one of three pins (PA1, PA2, PA3) of the microcontroller unit U2. The switch S2 selects between the different modes of Test, Auto, Dusk To Dawn, and Solar Tracking. When the Test Mode is selected, the switch S2 is effectively open. The switch S2 would correspond to the mode switch 30 discussed in connection with FIG. 2.

The indicators LED1 and LED2 would correspond to the LED indicators 26 discussed in connection with FIG. 1. The indicator LED 1 indicates when the motion detector is active, and the indicator LED2 acts as a power indicator. The indicator LED 1 will flash on any time a person travels across the covered area and triggers the motion detector 20. The indicator LED 1 can be used to help aim the motion detector 20, and the indicator LED 1 will flash on in the daytime as well as night.

The passive infrared (PIR) devices P1 and P2 are part of the motion detector 20 discussed in connection with FIGS. 1 and 2. The variable resistor VR4 can adjust the sensitivity of the motion detector 20. The motion detector 20 outputs a signal indicating movement in the covered area to the microcontroller unit U2.

The variable resistors VR1 and VR2 are also connected to the output of voltage regulator U3. The output of variable resistors VR1 and VR2 are also input to the microcontroller unit U2. The variable resistors VR1 and VR2 would correspond to the timer switch 32 and the dimmer dial 40 discussed in connection with FIG. 2.

The present lighting system 10 is operable in several different modes, and can automatically adjust for the longer and shorter nights that result from seasonal change. Depending upon the latitude at which the lighting system is used, the duration of nighttime often varies by several hours throughout the year. The present lighting system can also provide for several different modes of operation under the electronic control of a programmable MCU. One potential benefit of an electronic design for the lighting system 10 is that a battery backup may be used to temporarily store the recorded nighttime durations so that the lighting system 10 can continue normal operation after brief power outages. In a preferred embodiment, the tracked nighttime duration data is retained in memory unless there is an extended power outage, at which the tracked data may be lost and the lighting system will reset to the six hour default.

While several particular forms of the invention have been illustrated and described, it will be apparent that various modifications can be made without departing from the spirit and scope of the invention. Accordingly, it is not intended that the invention be limited, except as by the appended claims.

We claim:

1. A lighting system comprising:
   a lamp;
   a photocell configured to sense ambient light conditions;
   a microcontroller unit having memory for storing data based on conditions sensed by the photocell, wherein the microcontroller unit activates the lamp when the photocell senses a specific ambient light condition, and the microcontroller unit uses the stored data to determine the duration of time for activating the lamp.

2. The lighting system of claim 1, further comprising a motion detector in communication with the microcontroller unit such that the microcontroller unit is programmed to control the activation of the lamp in response to a signal from the motion detector sensing movement in a specific area.

3. The lighting system of claim 2, wherein a requirement for the microcontroller unit to activate the lamp in response to the signal from the motion detector is for the duration of time for activating the lamp have ended when the microcontroller unit receives the signal from the motion detector.

4. The lighting system of claim 1, wherein the specific ambient light condition is when the ambient light level is below a first threshold value.

5. The lighting system of claim 4, wherein the stored data represents the prior amount of time during which the ambient light level previously was below the first threshold value.

6. The lighting system of claim 5, wherein the duration of time for activating the lamp the stored data is based on one-half the prior amount of time during which the ambient light level previously was below the first threshold value.

7. A lighting system comprising:
   illumination means for emitting illumination;
   light detection means for generating a first light detection signal when an ambient light level is below a first threshold value, and generating a second light detection signal when the ambient light level is above a second threshold value;
   time measuring means for measuring the prior amount of time elapsed between the when a prior first light detection signal was previously generated and when a prior second light detection signal was previously generated;
   memory means for storing the measured prior amount of time between first and second light detection signals;
   program means for determining the length of time the illumination means will remain activated based on the measured prior amount of time during which the ambient light level was below the threshold value stored in the memory means;
   control signal means for generating a first control signal for activating the illumination means for the determined length of time after receiving the light detection signal, wherein the control signal means generates a second control signal for deactivating the illumination means after the determined length of time for activating the illumination means.

8. The lighting system of claim 7, further comprising motion signal means for generating a motion signal responsive to detection of movement in a monitored area; wherein the control signal means generates a motion-based control signal for activating the illumination means for a predetermined duration of time when the control signal means receives the motion signal after the second control signal is generated but before the control signal means receives the second light detection signal.

9. The lighting system of claim 7, further comprising motion signal means for generating a motion signal responsive to detection of movement in a monitored area; wherein, when the control signal means receives the motion signal during the determined length of time for which the illumination means is activated, the control signal means generates a motion-based control signal to cause the illumination means to emit increased illumination for a predetermined duration of time.

10. The lighting system of claim 7, wherein the first threshold value equals the second threshold value.

11. The lighting system of claim 7, wherein the determined length of time the illumination means will remain activated is one-half of the prior amount of time.

12. The lighting system of claim 7, wherein the determined length of time the illumination means will remain activated is selectably offset from one-half of the prior amount of time.

13. The lighting system of claim 7, further comprising mode selection means for selecting a different mode of operation, wherein the selection of the different mode of operation causes the control signal means to generate a dusk control signal to activate the illumination means after receiving the light detection signal, and generate a dawn control signal to deactivate the illumination means after the control signal means receives the second light detection signal.

14. The lighting system of claim 7, further comprising mode selection means for selecting a different mode of operation, wherein the selection of the different mode of operation causes the control signal means to generate a motion-based control signal to activate the illumination means for a predetermined amount of time after receiving the first light detection signal and the motion signal, but before the control signal means receives the second light detection signal.

15. A method of controlling a lighting system comprising the steps of:

generating a first light detection signal responsive to an ambient light level being below a first threshold value;

generating a second light detection signal when the ambient light level subsequently is above a second threshold value;

measuring the prior amount of time elapsed between when a prior first light detection signal was previously generated and when a prior second light detection signal was previously generated;

storing in memory the measured prior amount of time elapsed between the first and second detection signals;

determining the length of time to activate a light source based on the stored prior amount of elapsed time;

activating the light source for the determined length of time after receiving the light detection signal, and deactivating the light source after the determined length of time for activating the a light source.

16. The method of controlling a lighting system of claim 15, further comprising the steps of:

generating a motion signal responsive to detection of movement in a monitored area; and activating the light source for a predetermined duration of time when a motion signal has been generated, and after the lamp has been deactivated based the determined length of time, and before the second light detection signal is generated.

17. The method of controlling a lighting system of claim 15, further comprising the steps of:

generating a motion signal responsive to detection of movement in a monitored area; and activating the light source for a predetermined duration of time when the motion signal has been generated during the determined length of time for which the light source is activated, wherein the light source emits increased illumination for the predetermined duration of time.

18. The method of controlling a lighting system of claim 15, wherein the first threshold value equals the second threshold value.

19. The method of controlling a lighting system of claim 15, wherein the determined length of time the light source will remain activated is one-half of the prior amount of time.

20. The method of controlling a lighting system of claim 15, wherein the determined length of time the light source will remain activated is selectably offset from one-half of the prior amount of time.

* * * * *